(12) United States Patent
Stanton

(10) Patent No.: US 8,984,881 B1
(45) Date of Patent: Mar. 24, 2015

(54) STEAM ENGINE POWERED HYDROGEN OXYGEN GENERATION SYSTEM FOR AN INTERNAL COMBUSTION ENGINE

(71) Applicant: Arthur David Stanton, Garland, TX (US)

(72) Inventor: Arthur David Stanton, Garland, TX (US)

(*) Notice: Subject to any disclaimer, the term of this patent is extended or adjusted under 35 U.S.C. 154(b) by 0 days.

(21) Appl. No.: 14/140,465

(22) Filed: Dec. 24, 2013

(51) Int. Cl.
| | |
|---|---|
| *F02G 3/00* | (2006.01) |
| *F02M 21/02* | (2006.01) |
| *F02B 51/04* | (2006.01) |
| *F02B 73/00* | (2006.01) |

(52) U.S. Cl.
CPC ............ *F02M 21/0206* (2013.01); *F02B 51/04* (2013.01); *F02B 73/00* (2013.01)
USPC ....................... 60/614; 60/274; 60/275; 123/3

(58) Field of Classification Search
CPC ...... F02B 43/10; F02B 2043/106; F02B 1/04; F02B 61/045; F02B 63/02; Y02T 10/32; Y02T 10/121; Y02T 90/42; Y10S 123/12; F02M 25/12; C25B 9/06; C25B 1/04; C25B 9/00; C25B 9/08; B65D 3/12
USPC ............... 60/39.6–39.63, 597–624; 123/3, 123/559.1–566, 200–249
See application file for complete search history.

(56) References Cited

U.S. PATENT DOCUMENTS

| | | | |
|---|---|---|---|
| 4,271,793 A | 6/1981 | Valdespino | |
| 4,368,696 A | 1/1983 | Reinhardt | |
| 4,369,737 A | 1/1983 | Sanders | |
| 5,119,768 A * | 6/1992 | Russell | ......................... 123/1 A |
| 5,513,600 A | 5/1996 | Teves | |
| 6,209,493 B1 | 4/2001 | Ross | |
| 7,021,249 B1 | 4/2006 | Christison | |
| 7,100,542 B2 | 9/2006 | Ehresman | |
| 7,191,737 B2 | 3/2007 | Klein | |
| 8,347,645 B1 * | 1/2013 | Miller | ............................. 62/236 |
| 8,685,224 B2 * | 4/2014 | Russo et al. | .................. 205/637 |

* cited by examiner

*Primary Examiner* — Jesse Bogue
(74) *Attorney, Agent, or Firm* — John Gregory Baker

(57) ABSTRACT

A Steam Engine Powered System is provided which, when integrated with an internal combustion engine, generates hydrogen gases to provide an additional fuel source. The System's hydrogen is created by electrolysis from electrical power supplied from an external generator powered by the steam engine which in turn is powered by the radiant heat of the engine without putting a drain on the existing electrical system. The system will also store external canisters of separated Hydrogen and Oxygen for later use of various needs.

6 Claims, 5 Drawing Sheets

Figure 1:
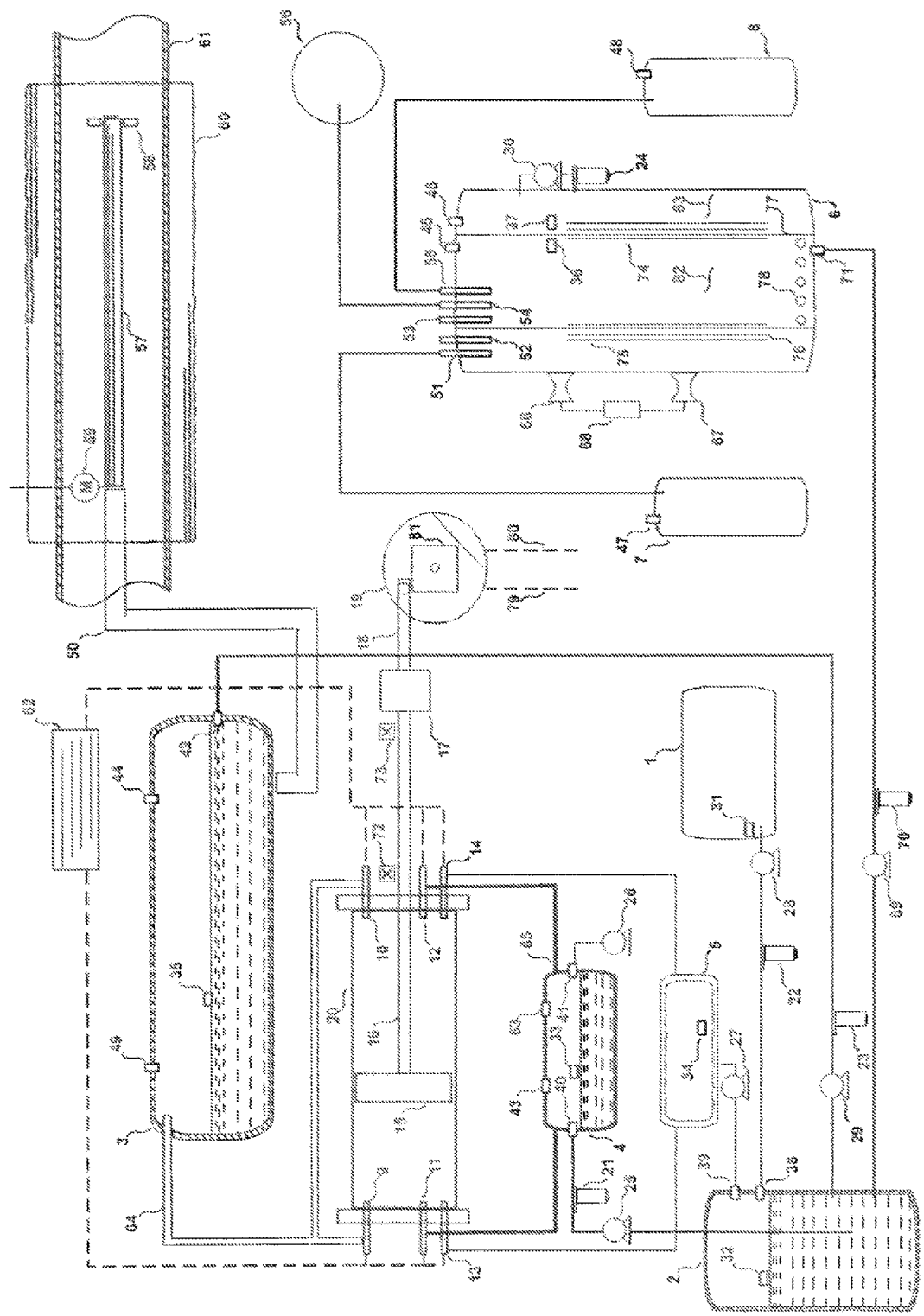

STEAM ENGINE POWERED HYDROGEN OXYGEN GENERATION SYSTEM FOR AN INTERNAL COMBUSTION ENGINE

FIELD OF THE INVENTION

The present invention relates to internal combustion engines, and particularity to engine waste heat powering a steam engine, which in turn powers an electric generator, which in turn powers the gas generator unit which produces hydrogen as an additional fuel which accurately meters in the correct amount of hydrogen into the internal combustion engine. The System additionally prevents hydrogen and oxygen from mixing during the electrolysis chemical reaction and stores both gases in separate removable canisters for later use. The system accomplishes this without adding any additional power requirements to the internal combustion engine and yet provides enough energy to operate the invention.

BACKGROUND OF THE INVENTION

Hydrogen was first discovered in 1781 by Henry Cavendish and is usually given credit for hydrogen's discovery as an element. Hydrogen is one of the most abundant elements in the universe. When hydrogen is used as a fuel it is non-polluting and clean burning. The resulting exhaust from the oxidation of hydrogen is water vapor. Hydrogen is the most clean and renewable resource available. Aggressive attention has been given to the research and development of feasibly utilizing hydrogen as a fuel with internal combustion engines. Because hydrogen does not exist in a pure state it must be "cracked" from one of its natural states such as water by the process of electrolysis. The obstacles that are present to overcome with this method, is power consumption. Several device designs are available that use electrolysis to generate hydrogen and oxygen to either replace or supplement fuels burned in internal combustion engines. However, these systems use the internal combustion engine's own electrical supply or the engine itself which places additional strain and electrical energy requirements on the engine's existing electrical system to drive system in order to produce the hydrogen. In these existing systems more energy is used to produce the hydrogen then the energy benefit from the use of the extra hydrogen. In the existing systems that use electrolysis to generate hydrogen and oxygen, those systems do not allow for the separation of the two gases. Since the oxygen is not separate from the hydrogen, this extra induction of oxygen into the systems creates adverse performance problems with the internal combustion engine and requires a workaround or even bypassing the engine's required $O^2$ sensors.

DESCRIPTION OF PRIOR ART

There are other devices designed for generating hydrogen for use in an internal combustion engine. Typical of these is U.S. Pat. No. 7,100,542 issued to Ehresman on Sep. 5, 2006. Yet another patent was issued to Christison on Apr. 4, 2006, U.S. Pat. No. 7,021,249. Yet another patent was issued to Teves on May 7, 1996, U.S. Pat. No. 5,513,600. Yet Another patent was issued to Reinhardt on Jan. 18, 1983, U.S. Pat. No. 4,368,696. Yet Another patent was issued to Valdespino on Jun. 9, 1981, U.S. Pat. No. 4,217,793. Yet Another patent was issued to Klein on Mar. 10, 2007, U.S. Pat. No. 7,191,737. Yet Another patent was issued to Ross on Apr. 3, 2001, U.S. Pat. No. 6,209,493. Yet Another patent was issued to Sanders et al on Jan. 25, 1983, U.S. Pat. No. 4,369,737.

Several patents pertaining to utilization of hydrogen gas as a source of fuel for the internal combustion engine exist but are not in production because of several drawbacks, disadvantages and inherent defects in the production of the hydrogen and energy requirements. Many of the existing patents utilize the electrical energy of the internal combustion engine in an attempt to drive the electrolysis process such as with Christison, U.S. Pat. No. 7,021,249; while the invention did separate the two gases the energy available from the electrolysis process did not produce more energy than used. Chistison's system did not generate additional power for the internal combustion engine since the internal combustion engine was used to create the hydrogen.

While other various patents offer improvements or enhancements within the apparatus such as a method to hold the electrolytic solution or a new design of the cathode and anode relationship, along with different electrolytic solutions which might include the use of lithium hydroxide (LION), potassium hydroxide (KOH) or sodium hydroxide (NAOH). These systems rely and use the engine's existing available electrical power and therefore decrease the total available electrical power of the engine, decrease the battery and alternator life. Further, because the total available electrical power of the engine is decreased, more fuel is needed to further charge the battery.

The patent issued to Reinhardt attempted to bypass the requirement to use the power of the internal combustion engine by utilizing the waste heat of the engine incorporating a Sterling Engine. However, the processes and method incorporated are not powerful enough nor will recover enough energy to generate electricity needed for successful electrolysis.

Another patent issued to Teves discusses utilizing as much as 5,000 amperes for the electrolytic process. The patent explains that the energy is derived from the automotive engine by transforming mechanical energy to electrical energy by means of a direct current generator. Placing an additional direct current generator would involve a substantial modification to the existing vehicles engine. It would be similar to adding and additional alternator which would require reconfiguring the existing pulleys, mount brackets, and belts. Further, it would use more fuel as the engine will need to convert more of the existing mechanical energy to electrical energy. The reconfiguration would add additional power requirements from the internal combustion engine in order to provide the power and torque to operate the electrolysis cell. As with any system, the creation of hydrogen by the use of electrolysis requires more energy to create the hydrogen gases than the hydrogen gases can provide as an energy source. Hence, the production of hydrogen using a mechanical means from the operation of an internal combustion engine will only add additional power requirements resulting in more carbon fuels being consumed.

Another patent issued to Valdespino offered an improvement to the internal combustion engine having a fuel system for feeding a fuel-air mixture to the combustion chambers and an electrical generation system, such as an alternator which further drains the current power requirements of the internal combustion engine.

Another patent issued to Klein provides improved methods for the creation of hydrogen gases but does not provide information where the power to operate the system will originate.

Another patent issued to Ross relates to an electrolysis cell kit for the internal combustion engine. Each terminal is connected to an anode and cathode which are connected to the terminals. Here again, an electrical drain and strain is placed on the engine's existing electrical system decreasing battery and alternator life and requiring more fuel.

Another patent issued to Sanders provides for a different style apparatus for electrolysis but yet, once again, an electrical drain and strain is placed on the engine's existing electrical system decreasing battery and alternator life and requiring more fuel.

SUMMARY OF THE INVENTION

The present invention overcomes the energy requirements of the prior art by providing an apparatus for the production and storage of hydrogen and oxygen without the need to utilize the electrical energy of the internal combustion engine. The hydrogen can be used as a fuel source in an internal combustion engine or a fuel additive to the existing fuel or stored for later use in external and removable tanks.

The forgoing and other objects and advantages will appear in the description to follow. In the description references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that the embodiments may be utilized and the structural changes may be made without departing from the scope of the invention in which part is discussed in the abstract. In the accompanying drawings, like the reference character that designates the same or similar parts throughout the several views. The following detailed description is, therefore, not to be taken in a limiting sense, and the scope of the present invention is best defined by the appended claims.

The invention system's hydrogen is created by electrolysis using a separate electrical source supplied from a generator powered by the steam engine. The steam engine is driven from the thermal radiant heat of the vehicle's engine which will not require any additional electrical or mechanical power requirements from the vehicle's engine. The are many ways in which the thermal radiant heat can be captured such as water filled heat rail pipes, exhaust gas flowing around other heat collecting devices, a means for circulating any of the engines heated fluids such has the engine water, engine oil, transmission oil, attachments to the engine exhaust system or engine manifold.

In the current invention, hydrogen and oxygen are prevented from mixing during the electrolysis process therefore only metering in pure hydrogen into the engine. This is also a differentiating feature of the invention.

This invention also allows for the storage of any extra hydrogen and further allows for the storage of oxygen. Both of these gases are stored in removable containers for any other use that may require raw hydrogen, oxygen or a mix of both. The full containers could be potentially sold and exchanged for empty containers. Each vehicle owner could become a supplier of these gases. Moreover, this system could provide raw hydrogen and oxygen for use in other industries. Hydrogen is used in many different industries including petroleum and chemical businesses. Hydrogen is used in hydrogenating fats and oils in the food industry. Hydrogen is also useful in producing methanol and reducing metal ores. Other industries use hydrogen for welding, power generators and cryogenics research, thus these removable canisters could be useful in any of these applications.

Oxygen is used in various industrial chemical applications. It is used to make acids, sulfuric acid, nitric acid, chemical combustion and other compounds. In addition it is used in industries that use the gas for cutting, welding and melting metals, metal refining, pulp and paper manufacturing, ceramic creation, glass making and petroleum processing. Moreover, oxygen is also part of pharmaceuticals and the medical field. Oxygen gas is used to destroy bacteria. Further, the same oxygen gas is used to treat victims of carbon monoxide poisoning. Thus, these extra canisters or containers of the oxygen gas can be used in many industries needing readily useable oxygen and hydrogen.

The oxygen could be configured upon an emergency vehicle such as a moving ambulance providing potentially life-saving ready oxygen to injured patients.

BRIEF DESCRIPTION OF THE DRAWING FIGURES

Figure 2:
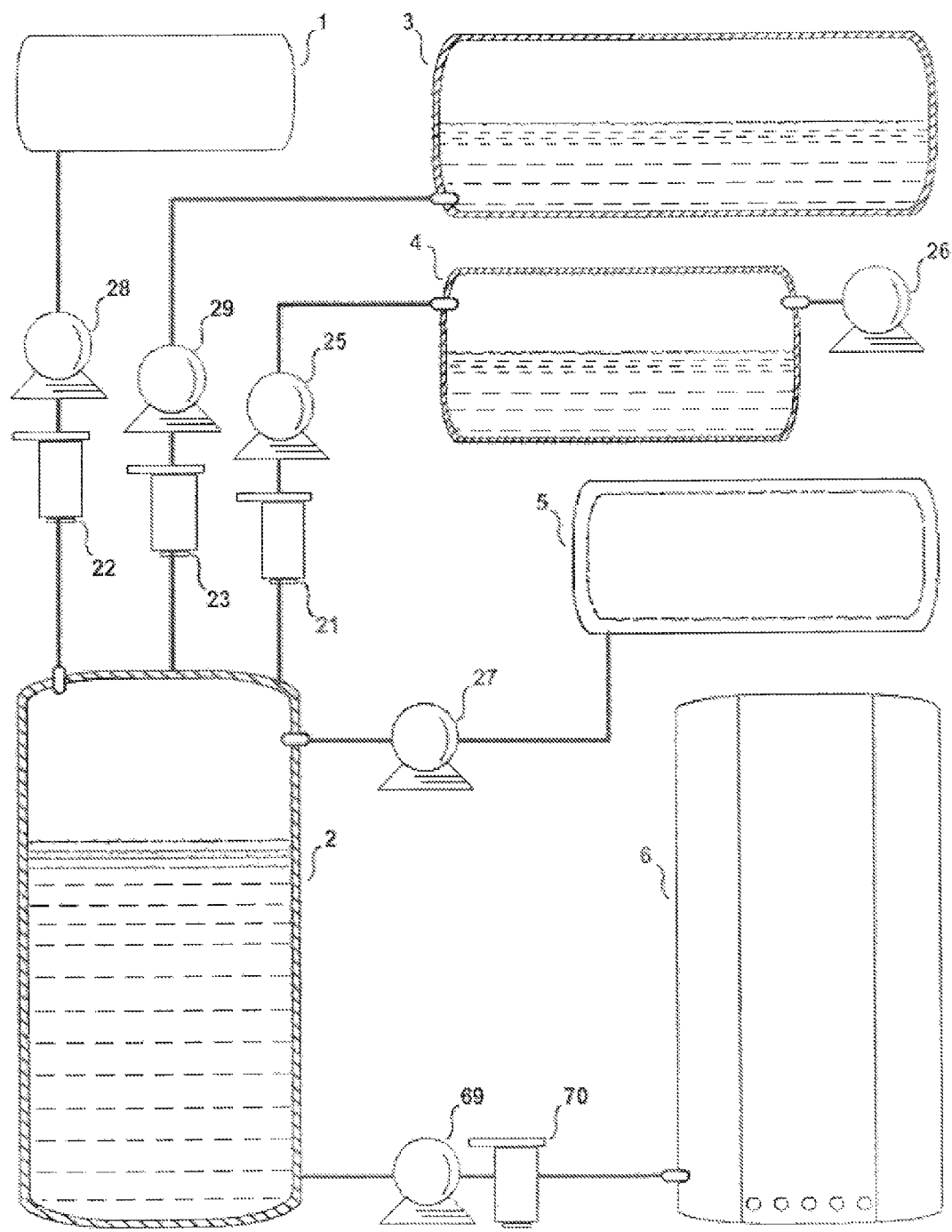
Figure 3:
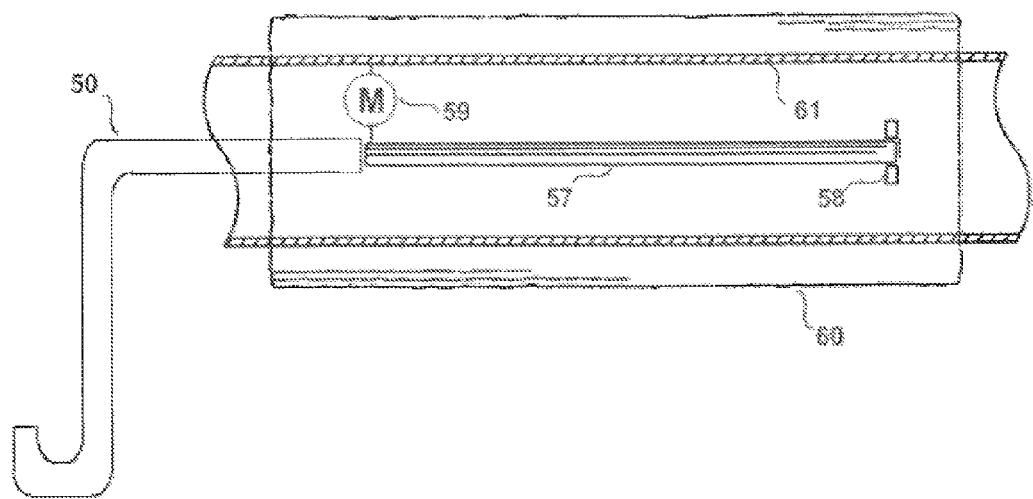
Figure 4:
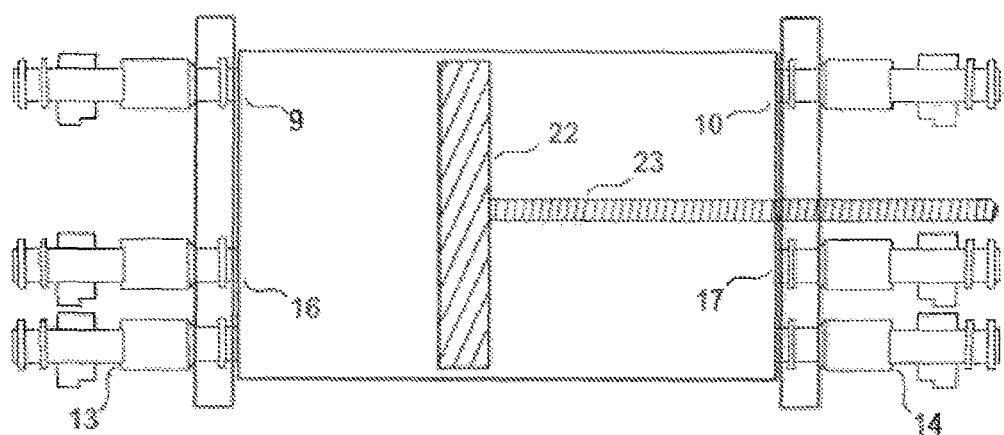
Figure 5:
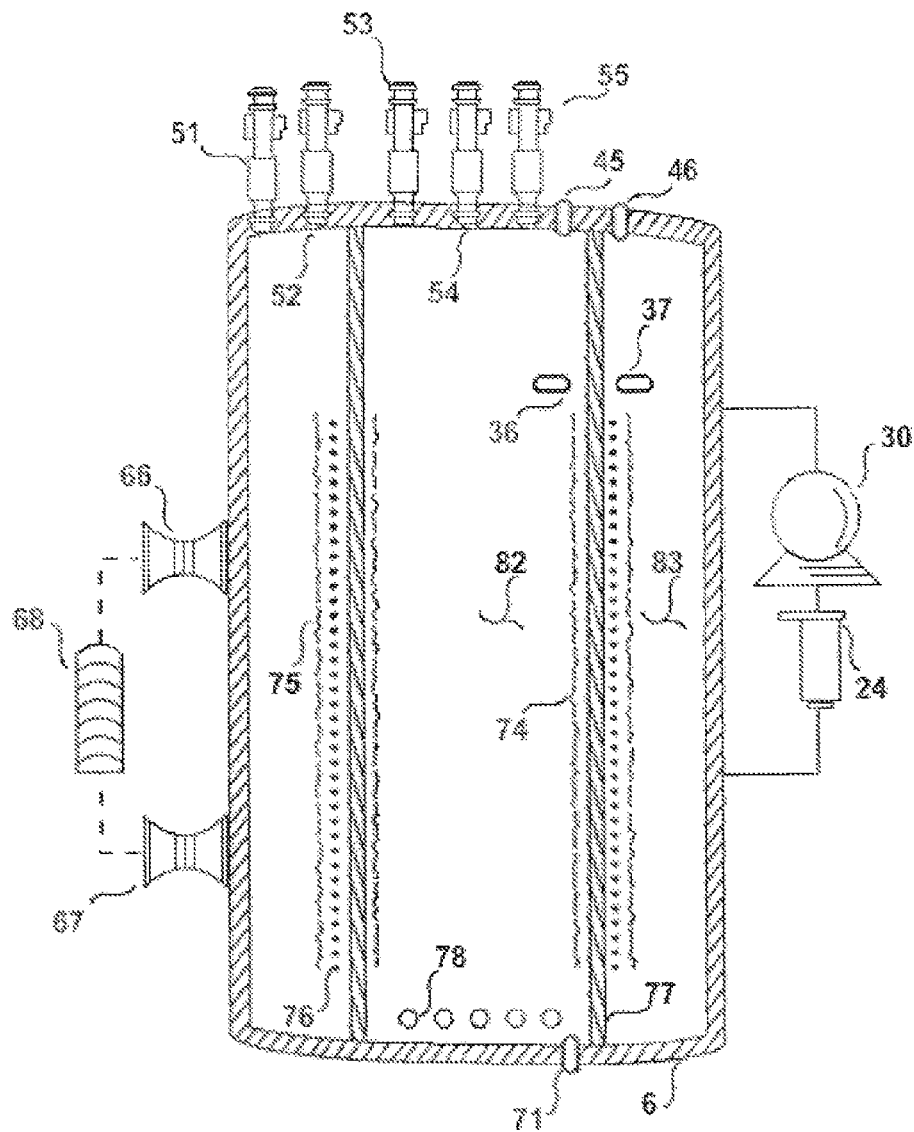

The advantages described herein will be more fully understood by reading an example of an embodiment in which the invention is used to advantage, referred to herein as the Detailed Description with reference to the drawings wherein:

FIG. 1 is an illustrative view of the total system;
FIG. 2 is an illustrative view of the tanks configuration;
FIG. 3 is an illustrative view of the heat rail assembly;
FIG. 4 is an illustrative view of the steam engine;
FIG. 5 is an illustrative view of gas generator tank assembly.

DESCRIPTION OF THE REFERENCED NUMBERS

Turning now descriptively to the drawings, in which similar reference in characters denote the similar elements throughout the several views, the figures illustrate the Steam Engine Powered Hydrogen Oxygen Generation System for an Internal Combustion Engine with regard to the reference numerals used, the following numbering is used throughout the various drawings figures:

1. Fill tank
2. Low Pressure Water Reservoir
3. Steam Vessel
4. Cooling Tank
5. Exhaust Condenser Tank
6. Gas Generation Tank
7. Oxygen Storage Tank
8. Hydrogen Storage Tank
9. High Pressure Steam Head Solenoid Valve
10. High Pressure Stream Tail Solenoid Valve
11. High Pressure Cooling Head Solenoid Valve
12. High Pressure Cooling Tail Solenoid Valve
13. Low Pressure Exhaust Head Solenoid Valve
14. Low Pressure Exhaust Tail Solenoid Valve
15. Steam Piston
16. Steam Piston Push Rod
17. Push Rod Connecting Block
18. Generator Push Rod
19. Generator Flywheel
20. Steam Engine Cylinder
21. Cooling Tank Filter
22. Low Pressure Reservoir Filter
23. Steam Vessel Filter
24. Gas Generation Tank Recirculation Filter
25. Cooling Tank Water Fill Pump
26. Cooling Tank Air Fill Pump
27. Exhaust Condenser Tank Evacuation Pump
28. Fill Tank Transfer Pump
29. Steam Vessel Fill Pump
30. Gas Generation Tank Recirculation Pump
31. Fill Tank Water Level Sensor 32. Low Pressure Reservoir Water Level Sensor—Float Valve that
33. Cooling Tank Water Level Sensor
34. Exhaust Condenser Tank Water Level Sensor
35. Steam Vessel Water Level Sensor
36. Hydrogen Gas Generation Tank Water Level Sensor
37. Oxygen Gas Generation Tank Water Level Sensor
38. Fill Tank One Way Check Valve
39. Exhaust Condenser Tank One Way Check Valve
40. Low Pressure Reservoir One Way Check Valve
41. Cooling Tank Air Fill Pump One Way Check Valve
42. Steam Vessel One Way Check Valve
43. Cooling Tank Pressure Sensor
44. Steam Vessel Pressure Sensor
45. Hydrogen Gas Generation Tank Pressure Sensor
46. Oxygen Gas Generation Tank Pressure Sensor
47. Oxygen Storage Tank Pressure Sensor
48. Hydrogen Storage Tank Pressure Sensor
49. Steam Vessel Emergency Release Valve
50. Steam Vessel Steam Delivery Conduit
51. Oxygen Storage Solenoid Valve
52. Oxygen Vent Solenoid Valve
53. Hydrogen Vent Solenoid Valve
54. Hydrogen Delivery Solenoid Valve
55. Hydrogen Storage Solenoid Valve
56. Internal Combustion Air Intake
57. Water Filled Heat Rail Pipes
58. Heat Exchanger Rail Hinge
59. Heat Exchanger Motor
60. Heat Exchanger Housing
61. Internal Combustion Exhaust Pipe
62. Computer Controller
63. Cooling Tank Emergency Release Valve
64. Steam Vessel Steam Delivery Conduit
65. Cooling Tank Water Delivery Conduit
66. Hydrogen Generation Tank Upper Ultra Sonic Transducer Degasser
67. Hydrogen Generation Tank Lower Ultra Sonic Transducer Degasser
68. Hydrogen Generation Tank Ultra Sonic Transducer Driver
69. Generation Tank Fill Pump
70. Generation Tank Filter
71. Generation Tank One Way Check Value
72. Top Dead Center Head Sensor
73. Top Dead Center Tail Sensor
74. Cathode Screen
75. Anode Screen
76. Electrical Insulating Paper
77. Center Core
78. Circulation Vents
79. Positive Electrical Wire
80. Negative Electrical Wire
81. Electric Generator
82. Hydrogen Generation Compartment
83. Oxygen Generation Compartment

DEFINITIONS

1. The System—a steam engine powered hydrogen oxygen generation system for an internal combustion engine.
2. Pulsed—opening and closing a solenoid valve in controlled durations of time to regulate the volume of hydrogen into the engine.
3. Steam Vessel Pressure Minimal Operating Pressure—the pressure needed to actuate the steam driven piston.
4. Minimal Operating Requirements—requirements that maintain a water level that will produce adequate steam for the steam operation.
5. Steam Vessel Minimal Operating Requirements—maintain a water level that will produce adequate steam for the steam operation.
6. Air Pressure Minimal Operating Requirements—the minimal air pressure required to inject water coolant into the steam piston.
7. Gas Generation Tank Minimal Water Level Operating Requirement—sufficient water level need for the operation electrolysis.
8. Computer Controller Diagnostic Routine—a computer program that will check each area of operation such as water levels, pressures, temperatures, and will verify that the system is ready to start.
9. Heat Rail or Heat Rail Collectors or Heat Rail Pipes—a device collecting a sufficient level of thermal radiant engine heat to create steam.

PREFERRED EMBODIMENT

The preferred embodiment of this invention is for use on large internal combustion vehicles such as semi-trucks since these vehicles have a greater potential of fuel savings due to the semi-trucks higher required fuel consumption. However, even smaller vehicles could derive a fuel savings benefit from the invention. Further, emergency vehicles and ambulances could use the ready extra oxygen in the cabin of the vehicle for medical uses for traveling patients.

DETAILED DESCRIPTION

Referring to FIG. 1 is an illustrative view of the present invention wherein at engine startup the vehicles ignition system will power up computer controller 62 and will initiate the startup computer controller diagnostic routine. The Heat Exchanger Rail 57 is retracted to the maximum distance away from the Exhaust pipe 61. A water level check is made utilizing the Low Pressure Reservoir Water Level Sensor 32 of the Low Pressure Reservoir 2. If the Low Pressure Reservoir Water Level Sensor 32 indicates the water level is below Minimal Operating Requirements, a warning indicator will be triggered in the cabin of the vehicle, the system will be shut down and in order for the system to restart, the operator of the vehicle will place water in Fill Tank 1. If the Fill Tank Water Level Sensor indicates the water level is below Minimal Operating Requirements the Computer Controller 62 will engage the Fill Tank Fill Pump 28, and the Fill Tank Fill Pump 28 will pump water from the Fill Tank 1 into the Low Pressure Reservoir 2 through the Fill Tank Filter 22 further flowing the water past the Fill Tank One Way Check Value 38, into the Low Pressure Reservoir 2. A water level check is made in the Steam Vessel 3 with the Steam Vessel Water Level Sensor 35 of Steam Vessel 3. If the Steam Vessel Water Level Sensor 35 indicates the water level is below Minimal Operating Requirements the computer controller will engage the Steam Vessel Fill Pump 29, and the Steam Vessel Fill Pump will pump water from the Low Pressure Reservoir flowing through the Steam Vessel Filter 23 further flowing the water past the Steam Vessel one way check value 42, into the Steam Vessel. A water level check is made on Cooling Tank 4 using the Cooling Tank Water Level Sensor 33. If the Cooling Tank Water Level Sensor 33 indicates the water level is below Minimal Operating Requirements the Computer Controller 62 will engage the Cooling Tank Fill Pump 25, and the Cooling Tank Fill Pump 25 will pump water from the Low Pressure Reservoir 2 flowing through the Cooling Tank Filter 21 further flowing the water past the Cooling Tank one way check valve 40, into the Cooling Tank 4. An air pressure level check is made on Cooling Tank 4 using the Cooling Tank Pressure Sensor 43. If the Cooling Tank Air Pressure Sensor 33 indicates the air pressure level is below Air Pressure Minimal Operating Requirements the Computer Controller 62 will engage the Cooling Tank Air Fill Pump 26, and the Cooling Tank Air Fill Pump 26 will pump air from the outside atmosphere flowing through the Cooling Tank One Way Check Valve 41. A water level check will be made in the Hydrogen Generation Compartment 82 using the Hydrogen Generation Tank Water Level Sensor 36. Simultaneously, a water level check will be made to the Oxygen Generation Compartment 83 using the Oxygen Generation Tank Water Level Sensor 37. If the Generation Tank Water Level Sensor 36 indicates the water level is below the Hydrogen Generation Compartment Minimal Water Level Operating Requirement the Computer Controller 62 will engage the Generation Tank Fill Pump 69, and the Generation Tank Fill Pump 69 will pump water from the Low Pressure Reservoir flowing through the Generation Tank Filter 70 further flowing the water past the Generation Tank One Way Check Value 71, into the Generation Tank 6. The Heat Exchanger Rail 57 is moved to the minimum distance towards the exhaust pipe 61 by Heat Exchanger Motor 59. A steam pressure check is made utilizing the Steam Vessel Pressure Sensor 44 until Steam Vessel Pressure Minimal Operating Pressure is achieved. The High Pressure Steam Tail Solenoid Valve 9 which is can be a customized 1500 cc high flow injector is pulsed allowing the induction of steam from the Steam Vessel 3 through the Steam Vessel Steam Delivery Conduit 64 moving the steam piston 15 to the head of the Steam Engine Cylinder 20. Simultaneously pulsing High Pressure Steam Head Solenoid Valve 10 and pulsing High Pressure Cooling Tail Solenoid Valve 11. The High Pressure Steam Head Solenoid Valve 10 allows the induction of steam from the Steam Vessel 3 through the Steam Vessel Steam Delivery Conduit 64 moving the Steam Piston 15 toward the Tail of the Steam Engine Cylinder 20. Pulsing the High Pressure Cooling Head Solenoid Valve 11 will cool the high pressure steam condensing it creating a vacuum to further assist the velocity of the piston head towards tail in Steam Cylinder 20. The Top Dead Center Head Sensor 73 will trigger the Computer Controller 62 to communicate to the Low Pressure Exhaust Tail solenoid Valve 13 to pulse long enough to allow the condensed water droplets to be exhausted from the piston chamber upon piston head reaching top dead center into Exhaust Condenser Tank 5. Then Repeat the previous cycle so at to engage the Steam Piston 15 in multiple, rapid cycles. The Top Dead Center Tail Sensor 72 will trigger the Computer Controller 62 to communicate to the Low Pressure Exhaust Head Solenoid 14 to pulse long enough to allow that condensed water droplets to be exhausted from the piston chamber upon Steam Piston 15 head reaching head dead center into Exhaust Condenser Tank 5. A water level check will be performed by the Exhaust Condenser Tank Water Level Sensor 34 located in the Exhaust Condenser Tank 5 to determine if the water levels need to be evacuated and pumped into the Low Presser Reservoir 2. If the Exhaust Condenser Tank Water Level Sensor 34 senses water in the Exhaust Condenser Tank 5, the condensed water will be evacuated by triggering the Exhaust Condenser Tank Evacuation Pump 27 to push the water though the Exhaust Condenser Tank One way Check Valve 39. The Steam Engine 20 is now operating and the Steam Piston Push Rod 16 which is connected to the Push Rod Connecting Block 17 which actuates Generator Push Rod 18 actuating the Generator Flywheel 19 actuating the Electric Generator 81 to rotate so as to generate electricity. Electrical power will flow into the Gas Generation Tank 6 via Positive Electrical Wire 79 and the Negative Electrical Wire 80. The Positive Electrical Wire 79 will terminate to the Anode Screen 75 inside the Oxygen Generation Compartment 83. The Negative Electrical Wire 80 will terminate to the Cathode Screen 74 inside the Hydrogen Generation Compartment 82. The Anode Screen 75 is wrapped around the Center Core 77 of the Gas Generation Tank 6. The Cathode Screen 74 is wrapped around the inside of the Center Core 77 and is separated by Electrical Insulating Paper 76 which will prevent the two gases from mixing. The electrical flow will begin electrolysis. In order to ensure good mixture and a continuous flow of the water in the Gas Generation Tank 6, Circulation Vents 78 will allow for circulation within the Gas Generation Tank 6 between the Hydrogen Generation Compartment 82 and the Oxygen Generation Compartment 83. Gas Generation Tank Recirculation Pump 30 will circulate the water within the Gas Generation Tank 6 and filter it through Gas Generation Tank Recirculation Filter 24. The Hydrogen Gas Generation Tank Water Level Sensor 36 will maintain proper water levels within the Gas Generation Tank 6. The Oxygen Gas Generation Tank Water Level Sensor 37 will maintain proper water levels within the Gas Generation Tank 6. During electrolysis Hydrogen is produced in the Hydrogen Generation Compartment 82 of the Gas Generation Tank 6 and will rise to the top of the Hydrogen Generation Compartment 82 and will build pressure inside the Hydrogen Generation Compartment 82. At the same time during electrolysis Oxygen is produced in the Oxygen Generation Compartment 83 of the Gas Generation Tank 6 and will rise to the top of the Oxygen Generation Compartment 83 and will build pressure inside the Oxygen Generation Compartment 83. The Hydrogen pressure will be monitored by the Hydrogen Gas Generation Tank Pressure Sensor 45 and the Oxygen pressure will be monitored by the Oxygen Gas Generation Tank Pressure Sensor 46. If the Hydrogen pressure in the Hydrogen Generation Compartment 82 exceeds the standard operating pressure, the Hydrogen Vent Solenoid Valve 53 will vent to the atmosphere so as to control the pressure. If the Oxygen pressure in the Oxygen Generation Compartment 83 exceeds the standard operating pressure, the Oxygen Vent Solenoid Valve 52 will vent to the atmosphere so as to control the pressure. Hydrogen Delivery Solenoid Valve 54 will meter the correct amount of hydrogen by pulses in varying durations, depending on the length of the pulse and the length of time between pulses, exact amounts of Hydrogen can be metered into the engine. Hydrogen Storage Solenoid Valve 55 will allow extra Hydrogen to flow into the Hydrogen Storage Tank 8. Hydrogen Storage Tank Pressure Sensor 48 will monitor the Hydrogen Storage Tank Pressure 8. Oxygen Storage Solenoid Valve 51 will allow extra Oxygen to flow into the Oxygen Storage Tank 7. Oxygen Storage Tank Pressure Sensor 47 will monitor the Oxygen Storage Tank Pressure. As the water in the Gas Generation Tank 6 is circulated by the utilization of the Gas Generation Tank Recirculation Pump 30, any foam or bubbles will be out gassed by engaging the Hydrogen Generation Tank Upper Ultra Sonic Transducer Degasser 66 and the Hydrogen Generation Tank Lower Ultra Sonic Transducer Degasser 67 by the Hydrogen Generation Tank Ultra Sonic Transducer Driver 68.

What is claimed is:

1. A Steam Engine Powered Hydrogen Oxygen Generation System for an Internal Combustion Engine which when integrated with an internal combustion engine generates, separates, and stores hydrogen and oxygen in which the hydrogen and oxygen is created from electrolysis that is power by the system's electrical power supplied from the system's electrical generator which is powered by the system's steam engine which in turn is powered by the radiant thermal heat of the internal combustion engine without putting a drain on the existing internal combustion engine's electrical system and further supplies the hydrogen as an additional fuel source to the internal combustion engine comprising:

a fill thank, a means for supplying water into fill tank, a low pressure water reservoir to store extra water, a steam vessel with a means for generating steam, a communicable connection from the steam vessel to the low pressure reservoir for receiving water from the low pressure reservoir, a cooling tank, a steam engine, a means for condensing the spent steam from the steam engine, an exhaust condenser tank, a means for exhausting the steam engine's condensed steam to the exhaust condenser tank, a gas generation tank with a means for producing separated hydrogen and oxygen, a hydrogen storage tank, a means for gathering and storing the generated hydrogen gas into the hydrogen storage tank, a oxygen storage tank, a means for gathering and storing the generated oxygen gas into the oxygen storage tank, an electric generator, a means for utilizing the steam engine's steam pressure to actuate the electric generator, a cooling tank air fill pump, a means for pressuring the cooling tank fill pump, a means for circulating the water in the gas generation tank, a means for determining water levels in all system tanks, a means for preventing backflow of all liquids such as one way check valves, a means for determining tank pressures, emergency relief valves on all pressurized tanks, integrated means for exchanging heat between the internal combustion engine such as water filled pipes functioning as heat rail collectors, a communicable connection between the thermal heat of the internal combustion engine and the steam vessel such as a means for allowing the free flow of water and steam between the water filled heat rail pipes and the steam vessel, a means to meter and control the flow of hydrogen to the fuel supply of the internal combustion engine, a means for regulating the temperature of the radiant heat collected from the water filled heat rails pipes, heat exchanger housing used to encapsulate and protect the water filled heat rail pipes, a means for attaching the heat exchanger housing to the exhaust pipe, a means for varying the distance between the water filled heat rail pipes and exhaust pipe to maintain a selected temperature, a computer controller, a means for the computer controller to regulate and control the operation of the system, a steam vessel steam delivery conduit between the steam vessel and heat rail pipes, a cooling tank water delivery conduit between the cooling tank and the high pressure head solenoid valve and the high pressure tail solenoid valve, a hydrogen generation ultra-sonic transducer degasser, a ultra-sonic transducer driver, electrical insulating paper.

2. The system of claim 1, wherein the means for the gas generation tank to produce separated hydrogen and oxygen will be performed by electrolysis using electrical insulating paper separating the cathode and anode so as to prevent the mixing of the gases.

3. The system of claim 1, wherein the oxygen tank further includes a means for communicating and filtering the oxygen to the cabin of an vehicle, ambulance or emergency vehicle suitable for medical needs.

4. The system of claim 1, wherein the means for exchanging heat between the internal combustion engine comprises:
a water filled spiraled pipe functioning as a heat collector that goes around an engine exhaust pipe or goes around part of the engine's manifold, a communicable connection between the thermal heat of the water and steam within the spiraled pipe heat collector pipe and the steam vessel.

5. The system of claim 1, comprising:
an ultra sonic transducer utilized to degas the hydrogen gas and the oxygen gas from the water contained in the gas generation tank configured to allow both gases to rise to the top of the hydrogen and oxygen chambers effectuating an increase in tank pressure.

6. The system of claim 1, further comprising:
removable oxygen storage tanks, and a removable hydrogen storage tank.

\* \* \* \* \*